(12) United States Patent
Webb et al.

(10) Patent No.: US 8,812,370 B2
(45) Date of Patent: Aug. 19, 2014

(54) SYSTEM AND METHOD OF CENTRALIZED CUSTOMER INFORMATION MANAGEMENT FOR ENHANCED SHOPPING EXPERIENCE

(75) Inventors: Tim Webb, Rogers, AR (US); Jason Todd, Lowell, AR (US)

(73) Assignee: Wal-Mart Stores, Inc., Bentonville, AR (US)

( * ) Notice: Subject to any disclaimer, the term of this patent is extended or adjusted under 35 U.S.C. 154(b) by 703 days.

(21) Appl. No.: 12/187,193

(22) Filed: Aug. 6, 2008

(65) Prior Publication Data

US 2009/0043658 A1    Feb. 12, 2009

Related U.S. Application Data

(60) Provisional application No. 60/954,948, filed on Aug. 9, 2007.

(51) Int. Cl.
*G06Q 30/00* (2012.01)
*G06Q 30/06* (2012.01)

(52) U.S. Cl.
CPC ................................ *G06Q 30/0601* (2013.01)
USPC ........................................................ 705/26.1

(58) Field of Classification Search
CPC .................................................... G06Q 30/0601
USPC ............... 705/26, 27, 26.1, 26.2, 26.25, 26.3, 705/26.35, 26.4, 26.41–26.44, 26.5, 705/26.61–26.64, 26.7, 26.8, 26.81, 26.82, 705/26.9, 27.1, 27.2
See application file for complete search history.

(56) References Cited

U.S. PATENT DOCUMENTS

| | | | | |
|---|---|---|---|---|
| 5,960,411 | A * | 9/1999 | Hartman et al. | 705/26 |
| 6,064,980 | A * | 5/2000 | Jacobi et al. | 705/26.7 |
| 6,324,522 | B2 * | 11/2001 | Peterson et al. | 705/28 |
| 6,672,512 | B2 * | 1/2004 | Bridgelall | 235/462.46 |
| 2002/0065680 | A1 * | 5/2002 | Kojima et al. | 705/1 |
| 2002/0194089 | A1 * | 12/2002 | Clifton et al. | 705/26 |
| 2004/0262386 | A1 * | 12/2004 | Abrams et al. | 235/383 |
| 2008/0070569 | A1 * | 3/2008 | Shelley et al. | 455/426.2 |

OTHER PUBLICATIONS

Greg Linden et al. "Amazon.com Recommendations Item-to-Item Collaborative Filtering", IEEE Internet Computing, Jan./Feb. 2003, pp. 76-80.*
Bharat Rao, "Emerging Business Models in Online Commerce", Institute for Technology and Enterprise, Dec. 12, 1999.*

* cited by examiner

*Primary Examiner* — Naeem Haq
(74) *Attorney, Agent, or Firm* — Kenyon & Kenyon LLP (57) ABSTRACT

A system and method for providing a customer with enhanced shopping experience at a retail store provide associating the customer with a unique identification, storing information of the customer in a central database, wherein the information of the customer is retrievable according to the unique identification of the customer, responsive to a request by the customer, linking the customer to the information of the customer stored in the central database based on the unique identification of the customer, and based on an analysis of the information of the customer, providing the stored information of the customer to the customer to allow the customer to conduct a number of tasks including checking status of a transaction with the retail store, selecting a payment option for a transaction and receiving notification from the retail store about pending transactions.

19 Claims, 3 Drawing Sheets

SYSTEM AND METHOD OF CENTRALIZED CUSTOMER INFORMATION MANAGEMENT FOR ENHANCED SHOPPING EXPERIENCE

CROSS-REFERENCE TO RELATED APPLICATIONS

This application claims priority to U.S. Provisional Patent Application No. 60/954,948, filed Aug. 9, 2007, entitled "E-Wallet," which is herein incorporated by reference in its entirety.

FIELD OF THE INVENTION

The present invention relates to a system and method for managing transactions between a customer and a retailer or store. In particular, the present invention may provide a customer with a variety of flexible and secure payment options when transacting with a retailer or store. Further, the present invention may provide a customer with an enhanced customized shopping experience including improved notification of scheduled or upcoming services with itemized maintenance tasks, and improved status updates on the completion and/or progress of specific services for the customer.

BACKGROUND INFORMATION

Traditionally, a retail customer comes to a retailer or store, e.g., a Wal-Mart store or Sam's Club, for conducting a transaction, e.g., purchasing a toy, or purchasing a service such as an automobile maintenance service. For this kind of traditional retail transactions, the customer may need to pay for each transaction separately with money or money equivalents, e.g., credit using a credit card. For example, the customer may enter a superstore, e.g., a Sam's Club with multiple objectives. He may want to purchase auto tires and have them installed in the onsite garage and during the same time, to purchase other items from the store. To achieve his objectives, the customer may need to conduct two separate transactions, each of which is not associated with the other. The customer leaving his automobile in the garage while shopping for other items may not know the progress of his automobile service. Correspondingly, the store may not have effective means to inform the customer of the progress of his automobile service.

Additionally, the customer for his transactions may need to bring different types of identifications, money or money equivalents, or even discount coupons to the store. For example, the customer may need to bring a club membership card for entering a membership store like Sam's Club, money or credit card for paying for purchased items, and coupons for receiving discounts at purchase. Further, the customer may need to keep receipts for checking out of a membership store. The customer may also need to keep the receipts for future transactions with the store, e.g., return, refund, or servicing a purchased item under warranties by the store. The customer may be responsible for remembering future service dates of a purchased item as well. All these nuances associated with transactions at a store may be burdensome to the customer.

Internet shopping may provide a customer with limited customized shopping experience. For example, a website selling books may make recommendations to the customer based on his past purchases. However, Internet shopping may not replace retail transactions at a retailer or store. For example, to replace automobile tires, the customer needs to bring the car to a garage. For certain type of shopping, e.g., perishable groceries, a customer may prefer to physically inspect the quality of the grocery before making a purchase decision.

SUMMARY

The present invention provides a centralized database system, called "WM Wallet", through which a customer may have an integrated and customized shopping experience at a retailer or store. The WM Wallet database may centrally store information associated with a customer in a database system. Based on the available customer information, an WM Wallet application residing on a server connected to or being part of the WM Wallet database system may analyze the customer information and generate events of customer services. A customer-facing terminal, called WM Wallet terminal herein for convenience, connected to the WM Wallet server may provide the customer with user interfaces for login to the WM Wallet system, for customizing customer profiles or preferences, for notification to the customer of upcoming events associated with the customer, and for transactions with the retailer or store.

DETAILED DESCRIPTION OF EXAMPLE EMBODIMENTS

Figure 1:
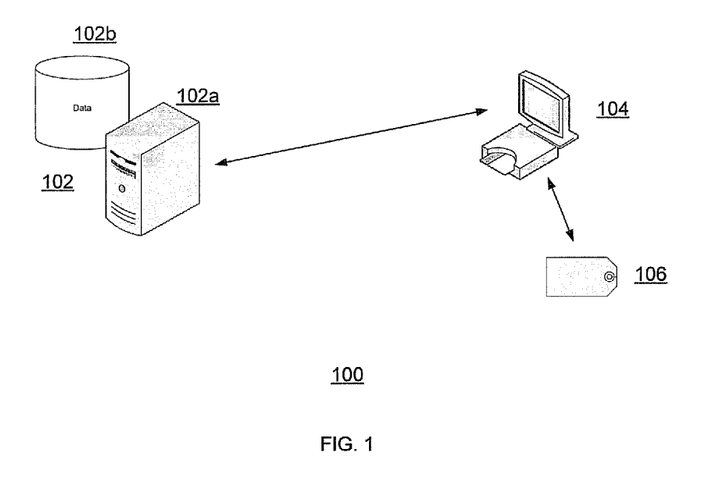
FIG. 1 shows an example WM Wallet system for managing the transactions between a customer and a retailer or store according to one example embodiment of the invention.

FIG. 1 illustrates an WM Wallet database system 100 according to one example embodiment of the present invention. The WM Wallet system 100 includes a central WM Wallet server 102a and an WM Wallet database 102b, one or more customer-facing WM Wallet terminals 104 and an identification medium 106 associated with a customer. The WM Wallet server 102a and database 102b may store detailed information about a customer. The WM Wallet server 102a may be a separate server or be a part of the WM Wallet database 102b. Together the WM Wallet server 102a and the WM Wallet database 102b as a whole are referred to as an WM Wallet database/server 102 herein for convenience. Information stored in the WM Wallet database/server 102 may be accessed by a customer at the customer-facing WM Wallet terminal 104. The WM Wallet terminal 104 may be a point-of-sale (POS) terminal located at a check-in or check-out center of a retailer. The WM Wallet terminal 104 may also be a terminal located in any portion of a store (e.g., at the entrance or exit points of a store). The identification medium 106 may be any medium storing an identifier by which a customer may be uniquely identified. One example of the identification medium 106 may be a card that magnetically stores a customer identification number. The identification medium 106 may also be an RFID tag or device including an RFID tag, e.g., a cell phone, that may be used to convey a customer identification number to the central database/server 102. The identification medium 106 may also be a near field communication (NFC) chip embedded in a handheld device.

The WM Wallet database/server 102 may be maintained centrally by a store, or in a centralized location for multiple stores. The store that maintains the WM Wallet database/server 102 may provide the customer interaction terminal 104 at or near a store location. By leveraging the information stored on the central WM Wallet database/server 102 and making the customized information available to the customer at a customer-face WM Wallet terminal 104, the shopping experience of the customer as well as the options and flexibility for conducting transactions may be improved.

The central WM Wallet database/server 102 may be used to store detailed information about a customer. The information stored on the central database/server 102 may include contact information for a customer such as the customer's name, mailing or billing address, telephone number, cell phone number and email address. The information stored on the central database/server 102 may also include information regarding various forms of payment methods that the customer may choose to use when conducting a transaction with the retailer. For example, debit account numbers, credit card numbers, Electronic Check Authorization (ECA) account numbers, and virtual shopping card numbers may be maintained on the central WM Wallet database/server 102.

Additionally, the central WM Wallet database/server 102 may store information related to a customer's shopping or transaction history including, for example, detailed information regarding each transaction a customer conducts with the retailer, membership information, discount information, limited pharmacy information, and vehicle information, e.g., Wal-Mart Tire Lube Express (TLE). Secured authorization may be used to limit access to the information stored for a particular customer. Collectively, the information maintained and made available for each customer may be referred to as the customer's "WM Wallet".

A customer may access the information stored in the customer's WM Wallet via any number of mechanisms that allow the customer to uniquely identify himself to the WM Wallet system 100. For example, a cell phone or a universal-type card, such as a credit card or other form factor, e.g. a key fob, may be used. In general, any medium for storing a unique identifier for the customer and any corresponding means for conveying that unique identification to the WM Wallet system 100 (e.g., optical, magnetic or RF readers) may be used. In addition to or as an alternative to conveying a unique identification, a customer may provide authentication information such as a PIN number, a password or some form of biometric identification to gain access to the information stored on the central WM Wallet database/service 102.

Once a customer establishes an WM Wallet with the retailer, and/or gains access to a pre-set WM Wallet stored in the central database/server 102, the customer may, for example, interact with the customer interaction terminal 104 to conduct any number of customized shopping transactions. That is, a number of different tasks or operations may be performed using an WM Wallet and the WM Wallet system 100. For example, by setting up an WM Wallet, the WM Wallet system 100 may transmit personalized notifications of certain events to the customer. Notifications may be made via any number or mediums such as, for example, by text message, email, voicemail, or some other forms of electronic communication. Notifications may be transmitted to the customer for any number of events including to indicate when the customer's vehicle is ready at the retailer's associated car servicing area, when photographs are ready from a photo lab, when a prescription is ready at the pharmacy, when an on-line order is ready to be picked up, or when an order is ready at the deli.

Notifications may be provided not only for in-store events such as those described above, but also for other events such as when scheduled maintenance is due on a vehicle, or when a product ordered on-line has been shipped to a store. In addition, personalized marketing messages may also be delivered to the customer in a similar manner.

Another task that may be performed using the WM Wallet system 100 is checkout and payment. A card or cell phone may be used to identify the customer at checkout, and after appropriate authorization (e.g., via PIN number entry) a customer may have any automatic or personal discounts applied. Further, the customer may have all authorized forms of payment (e.g., debit cards, credit cards, PayPal, etc.) presented as selectable options. Signature-less and/or paperless transactions may also be performed. Further, purchase transactions may be conducted with reduced time as much of the data to authorize a transaction for a customer may be pre-stored and pre-verified by the retailer.

Refund transactions may also be authorized and performed without requiring a paper receipt, given the accessibility of the original transaction via the purchase history stored in the customer's WM Wallet. Additionally, the customer's entire purchase or transaction history for each purchased item may also be accessible to a customer via the retailer's web site. Customized monthly, yearly, or periodical purchase statements may also be communicated to a customer on a regular basis.

The WM Wallet system 100 may also allow a customer to register with the WM Wallet system 100 (e.g., by using one of the identification conveying mechanisms described above) and then check the status of a vehicle service request, a pharmacy order, an optics order, a ship-to-store order, or status of any other source provided. The customer interaction terminal 104 may be used to register the customer with the WM Wallet system 100 and then to display relevant information on the status of transactions involving the customer (or to initiate a new transaction). Further, the WM Wallet system may allow a customer to view a shopping list, or receiving marketing or product information regarding a particular product.

A customer may also register with the WM Wallet system 100 upon entering or leaving a store or via the Internet through a web portal. For example, upon entering, identification of a customer may be used to notify a customer of the status of a fax and pull order or other special order, or to provide a customer with shopping reminders or targeted marketing information (e.g., for special members or customers). Additionally, once the WM Wallet system learns that a customer has entered the store, customer service personnel could be alerted such that fax and pull or other special orders for pickup by the customer may be completed more quickly.

The WM Wallet system 100 may also allow a customer to exit a store without having to present a paper receipt to verify the purchase of all items possessed by the customer when exiting the store. That is, upon leaving, a customer may swipe an WM Wallet system 100 card or RFID enabled device to have the list of purchased items displayed at an exit terminal for purchase verification. In this way, the need to present a paper receipt to customer service personnel at exit is eliminated.

The WM Wallet database system may provide a customer with a seamless integrated shopping experience. The customer may enter a retailer or store and check in to his WM Wallet through his ID tag, e.g. an RFID enabled cell phone, and a pin. In this way, the customer may not need to carry a stack of cards, book of checks, or cash because the WM Wallet of the customer contains information regarding payment methods of the customer's choice. The customer may not need to carry membership cards or discount cards for the same reason. In this way, the transaction between a customer and a retailer or store is streamlined.

Figure 2:
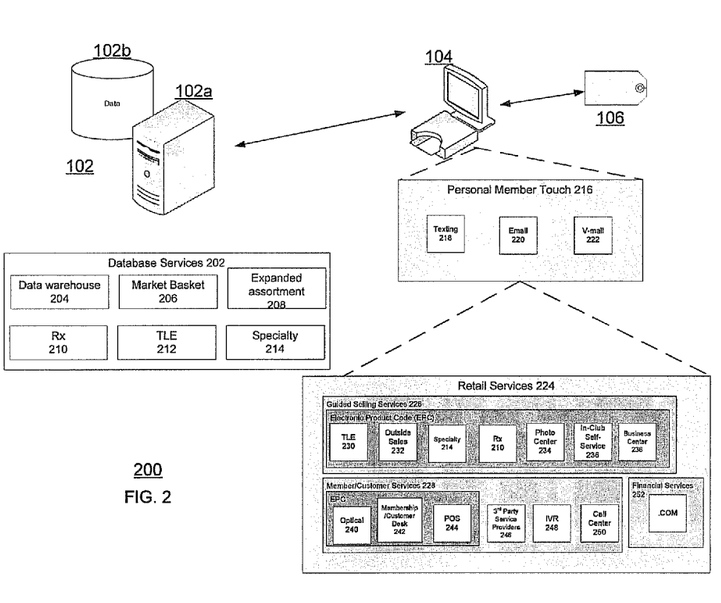
FIG. 2 shows an example WM Wallet system with detailed level components according to one example embodiment of the present invention.

FIG. 2 illustrates an WM Wallet system with further details according to one example of the WM Wallet database system. The WM Wallet database/server 102 may include database services 202. The database service may further include a data warehouse for storing customer account information, analysis of historical customer and sales data, offerings that may be expanded beyond current in-store offerings. In addition, the WM Wallet database 202 may include information extracted from customer service databases, e.g., databases for pharmacy (Rx), tire lube express (TLE), or specialty goods.

Responsive to requests from a customer-facing WM Wallet terminal 104, the WM Wallet application server 102a may generate and transmit customized events for the customer. These events may be transmitted to the customer through the WM Wallet terminal 104 through, e.g., text message 218, e-mail, or voicemail 222. The WM Wallet may aid the customer with a variety of retail services 224. In one example, the retail services may include guided selling services 226 or member/customer services 228, or financial service 252. The guided selling services 226 may include, e.g., TLE 212, outside sales 232, specialty 214, pharmacy 210, and photo center 234. For a wholesale club like, e.g., Sam's Club, the guided selling services 226 may also include in-club self-service 236 and business center 238. The guided service may use data, menus, or experts to assist a customer to make a complex purchase, e.g., a large screen TV. The member customer services 226 may include optical service 240, membership and/or customer desk 242, and services at point-of-sales (POS) 244. The member/customer services 228 may be provided through a third-party service provider 246, through an interactive voice response (IVR) system 248, or through a call center 250. The financial services may allow a customer to pay bills, buy money orders or cash checks. The different parts of the store business may be tied together through the Internet.

Figure 3:
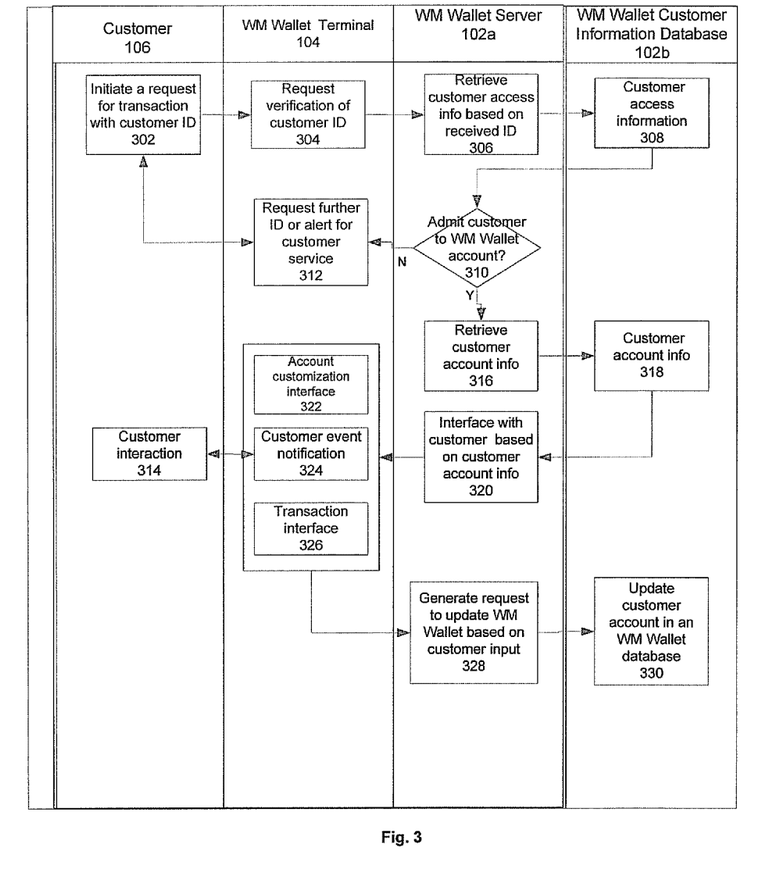
FIG. 3 shows an example cross-functional flowchart of an WM Wallet system for managing transactions between a customer and a retailer or store according to one example embodiment of the present invention.

FIG. 3 illustrates a cross-functional flowchart of a method for managing transactions between a customer and a retailer or store according to one example embodiment of the present invention. At 302, a customer may initiate a request for transaction with an WM Wallet terminal using some form of transmitter, such as an RFID tag, incorporated into a cell phone, or other handheld device maintained or possessed by the customer. To interact with the WM Wallet system 100, a customer may initiate the transfer of an identifier by first interacting with a reader (e.g., an RFID reader, magnetic reader, etc.) associated with the medium 106 maintained by the customer such that the identification of the customer may be communicated to the WM Wallet system 100. The reader may be associated with the WM Wallet terminal or kiosk 104. In one example embodiment of the present invention, at 304, the WM Wallet terminal 104 may send a request to an WM Wallet server 102a to request access by the customer to the WM Wallet database. The WM Wallet server 102a may be a server computer with one or more processors, memories, and hard drive storage. The WM Wallet server 102a may further include an WM Wallet database 102b on its hard drive storage, or may be connected to a centralized WM Wallet database at a separate location from the WM Wallet server 102a.

Based on the identification information provided to the WM Wallet server 102a, at 306, the server may retrieve the customer access information from the WM Wallet database 102b. In one embodiment of the present invention, the customer identification may be a combination of reading from an RFID tag activated from, e.g., a handheld device and a pin number/password. In an alternative embodiment of the present invention, the customer identification may be in the form of reading from an RFID tag activated from a cell phone and biometric measurements, e.g., fingerprints, from the customer. At 308, the WM Wallet database 102a may include customer access information stored, e.g., in the form of pairs of RFID sequences and pin numbers/passwords preset by the customer or by the store. Based on the retrieved customer access information, at 310, the WM Wallet server 102b may make a determination on whether to admit the customer to his WM Wallet account. If the WM Wallet server determines not to admit the customer based on a mismatch between the access information provided by the customer and stored in the WM Wallet database 102a, the WM Wallet terminal 104 may request from the customer further identification or alert a customer service representative 312. Otherwise, if the WM Wallet server determines to admit the customer to the WM Wallet database 102b, at 316, the WM Wallet server 102a may further retrieve information in the customer account 318.

The WM Wallet server 102a, based on information in the customer account, may generate interfaces to the customer. A first account customization interface 322 may allow the customer to set his preferences including, e.g., default/preferred payment methods, when and how often to send notifications, types of preferred notifications or changing pin number/password. A second customer event notification interface 324 may notify the customer of events related to the customer upon his check-in with the WM Wallet database. Events related to the customer may include pending scheduled services, e.g., automobile oil change, or events that may generally interest the customer based on, e.g., his shopping habit or his preset preferences. A third transaction interface 326 may allow the customer to conduct any number of transactions. For example, the customer may check in to the WM Wallet database and record transactions, e.g., change auto oil and tires and drop off a prescription. The customer may also inquire about registered ongoing transactions through the transaction interfaces. For example, the customer may check the status of a TLE or Rx service at any WM Wallet terminal by checking into the WM Wallet system using, e.g., an RFID enabled cell phone and pin number. After the interaction with the customer, if the WM Wallet server 102a determines that there is new information from the customer, the server may generate a request for updating the customer's WM Wallet account based on the customer input 328. The information in the customer account may be updated contemporaneously or in batch mode 330.

In an example embodiment of the present invention, a customer may come to a superstore with an WM Wallet database system. The customer may check into his WM Wallet account and receive a reminder message that his car is due for an oil change. Inside the store, the customer may drop his car at the garage and a prescription at the pharmacy, and update his WM Wallet account each time he conducts a transaction. The customer may also check his shopping list reminders. While shopping inside the store, the customer may push a button on his cell phone to activate an RFID transmission at any WM Wallet terminal to check his order status at TLE and Rx, or his shopping list reminders. The customer may also push a button on his cell phone to receive guided marketing and shopping information, e.g., special promotions on items that the customer has listed as interested items. Upon the completion of auto service or filling the prescription, the superstore may update the customer's WM Wallet account to indicate that the TLE service or the Rx service has been completed. The update may further cause the transmission of a notification message, e.g., a text message, e-mail, or a voice message, to the customer.

After the customer enters the items to be purchased at a counter, e.g., by scanning barcodes, the customer may push a button on his cell phone and initiate a transaction through an WM Wallet terminal with his WM Wallet account. The customer may first be required to login using a pin number or password. The WM Wallet may automatically apply any discounts that may apply to the customer including those accepted by the customer from the guided marketing and shopping information. The WM Wallet may present to the customer a list of tender options that the customer has stored in the WM Wallet for the customer to choose. The customer may choose a particular form of payment method to complete the transaction. The complete transaction history is stored in the WM Wallet and therefore, the customer may choose to not print out a receipt. Later refund or return by the customer may be based on the transaction history stored in the WM Wallet as well.

In another example embodiment of the present invention, a customer may enter a membership store, e.g., Sam's Club. At the entrance, the customer may push a button on a cell phone enabled with RFID tag at an WM Wallet terminal to log in his WM Wallet account. The check-in to the W M Wallet account may also automatically verify the customer's membership to the membership store. After check-in, the customer may check fax-and-pull order status, check special order status, receive shopping reminders and notifications from the store for selected members.

At the check out counter, the customer may push a button on his cell phone enabled with an RFID tag to log into his WM Wallet account again. By logging into his WM Wallet account, the customer may be saved from swiping a membership card because login to the customer WM Wallet account verifies the customer's membership. Similar to above, the WM Wallet may present the customer with a number of tender options that the customer stored in his WM Wallet account. After paying using a particular method, the customer may choose a paperless transaction, i.e., without receipt, because all information about the transaction is stored in the WM Wallet. At the exit of the membership store, the customer may push a button on his cell phone to bring up a list of items paid for in the store. The list on the terminal may be compared to the items being carried off premise. Therefore, this may save the need for marking on a paper receipt by a store personel.

A customer may also access his WM Wallet account through the Internet from a location different from the store, e.g., from his home. Through the Internet, the customer may allow online payment at a retailer or store with new tender types including ECA check, or manage accounts and secure bill payments, including credit cards. The customer may also view his shopping history, online receipts, or customized monthly purchase statements. Further, the customer may set up shopping lists and reminders in his WM Wallet account to be used at a retailer or store.

Those skilled in the art may appreciate from the foregoing description that the present invention may be implemented in a variety of forms, and that the various embodiments may be implemented alone or in combination. Therefore, while the embodiments of the present invention have been described in connection with particular examples thereof, the true scope of the embodiments and/or methods of the present invention should not be so limited since other modifications will become apparent to the skilled practitioner upon a study of the drawings, specification, and following claims.

What is claimed is:

1. A computer-implemented method for providing a customer with enhanced shopping experience at a retail store, comprising:
   storing information of the customer in a central database coupled to a server computer;
   receiving, by an access terminal situated in the retail store, an RFID signal that is transmitted from a handheld device of the customer who is entering or in the retail store, the RFID signal carrying an identification that uniquely identifies the customer;
   responsive to receiving the RFID signal by the access terminal, linking, by the server computer, the customer to information of the customer stored in a central database based on the unique identification of the customer;
   analyzing, by the server computer, the customer's past shopping habit to predict a plurality of events that potentially interest the customer;
   displaying in an event notification interface on the access terminal the predicted plurality of events to the customer;
   displaying a transaction interface on the access terminal that allows the customer to transact at least one of the predicted plurality of events;
   providing, on the access terminal by the server computer, the stored information of the customer to the customer to allow the customer to:
      (a) checking on status of an order or a transaction between the customer and the retail store;
      (b) selecting a payment option for a transaction between the customer and the retail store, the payment option being pre-set and being stored in the central database as a part of the information of the customer; and
      (c) receiving notification on status of an order or transaction, or an upcoming order or transaction between the customer and the retail store; and
   based on the analysis of the information of the customer, providing the stored information of the customer to the customer to allow the customer to notifying a store of an entry into or exit from the store by the customer.

2. The computer-implemented method of claim 1, wherein the unique identification of the customer is stored in an electronically-readable medium embedded in a handheld device held by the customer.

3. The computer-implemented method of claim 2, wherein the handheld device is a cell phone.

4. The computer-implemented method of claim 2, wherein the RFID signal is transmitted from the handheld device to the access terminal situated in the retail store, the access terminal being connected to the central database.

5. The computer-implemented method of claim 4, wherein the linking includes transmitting a previously-selected pin number to the access terminal.

6. The computer-implemented method of claim 4, wherein the linking includes transmitting a previously-selected password to the access terminal.

7. The computer-implemented method of claim 4, wherein the linking includes transmitting a biometric measurement of the customer to the access terminal.

8. The computer-implemented method of claim 2, wherein the customer initiates the request from the handheld device.

9. The computer-implemented method of claim 8, wherein the customer initiates the request by pressing a button on the handheld device.

10. The computer-implemented method of claim 1, wherein the central database is located in a server computer separated from the retail store.

11. The computer-implemented method of claim 1, wherein the analysis of the information is based on the transaction history of the customer, customer-selected preferences, and pending transactions between the customer and the retail store.

12. The computer-implemented method of claim 1, further comprising:
   providing one or more interfaces to the customer for the customer to:
   (a) register a payment method to be stored in the central database,
   (b) select a payment method as a preferred method to be stored in the central database,
   (c) register a pending transaction with the retail store,
   (d) select a preferred notification transmission method,
   (e) select a preferred content of notification, or
   (f) select a pin number for access to the customer's information.

13. The computer-implemented method of claim 12, wherein the text message, e-mail, telephone call and voicemail are automatically generated based on the information of the customer stored in the central database.

14. The computer-implemented method of claim 1, wherein the notification is transmitted to the customer by at least one of text message, e-mail, telephone call and voicemail.

15. A computer-implemented method for providing a customer with enhanced shopping experience at a retail store, comprising:
   storing information of the customer in a central database coupled to a server computer;
   receiving, by an access terminal situated in the retail store, an RFID signal that is transmitted from a handheld device of the customer who is entering or in the retail store, the RFID signal carrying an identification that uniquely identifies the customer;
   responsive to receiving the RFID signal by the access terminal, linking, by the server computer, the customer to information of the customer stored in a central database based on the unique identification of the customer;
   analyzing, by the server computer, the customer's past shopping habit to predict a plurality of events that potentially interest the customer;
   displaying in an event notification interface on the access terminal the predicted plurality of events to the customer;
   displaying a transaction interface on the access terminal that allows the customer to transact at least one of the predicted plurality of events;
   providing, on the access terminal by the server computer, the stored information of the customer to the customer to allow the customer to:
   (a) checking on status of an order or a transaction between the customer and the retail store;
   (b) selecting a payment option for a transaction between the customer and the retail store, the payment option being pre-set and being stored in the central database as a part of the information of the customer; and
   (c) receiving notification on status of an order or transaction, or an upcoming order or transaction between the customer and the retail store; and
   based on the analysis of the information of the customer, providing the stored information of the customer to the customer to allow the customer to:
   (a) reviewing a shopping or a transaction history of the customer;
   (b) notifying a store of an entry into or exit from the store by the customer;
   (c) visually providing an indication of purchased items by the customer upon exit from the retail store;
   (d) returning a previously-purchased item to the retail store, the returning being approved based on a transaction history of the customer stored in the central database;
   (e) receiving marketing information targeted toward the customer, the targeted marketing information being generated based on the information of the customer;
   (f) receiving preferences for services; and
   (g) receiving special offers.

16. A system for providing a customer with enhanced shopping experience at a retail store, comprising:
   a memory;
   a hard drive storage;
   an access terminal situated in the retail store;
   a processor configured to execute computer instructions capable of:
      receiving an identification, wherein the identification is carried by an RFID signal that is transmitted from a handheld device of the customer who is entering or in the retail store to the access terminal, the identification uniquely identifying the customer;
      responsive to receiving the identification, linking the customer to information of the customer stored in a central database based on the unique identification of the customer;
      analyzing the customer's past shopping habit to predict a plurality of events that potentially interest the customer;
      executing an event notification interface application to display on the access terminal the predicted plurality of events to the customer;
      executing a transaction interface application to display on the access terminal that allows the customer to transact at least one of the predicted plurality of events; and
      providing to the access terminal the stored information of the customer to the customer to allow the customer to conduct:
         (a) checking on status of an order or a transaction between the customer and the retail store;
         (b) selecting a payment option for a transaction between the customer and the retail store, the payment option being pre-set and being stored in the central database as a part of the information of the customer; and
         (c) receiving notification on status of an order or transaction, or
      an upcoming order or transaction between the customer and the retail store,
   wherein the processor is further configured to execute computer instructions capable of based on the analysis of the information of the customer, providing the stored information of the customer to the customer to allow the customer to conduct notifying a store of an entry into or exit from the store by the customer.

17. A system for providing a customer with enhanced shopping experience at a retail store, comprising:
   a memory;
   a hard drive storage;
   an access terminal situated in the retail store;
   a processor configured to execute computer instructions capable of:

receiving an identification, wherein the identification is carried by an RFID signal that is transmitted from a handheld device of the customer who is entering or in the retail store to the access terminal, the identification uniquely identifying the customer;

responsive to receiving the identification, linking the customer to information of the customer stored in a central database based on the unique identification of the customer;

analyzing the customer's past shopping habit to predict a plurality of events that potentially interest the customer;

executing an event notification interface application to display on the access terminal the predicted plurality of events to the customer;

executing a transaction interface application to display on the access terminal that allows the customer to transact at least one of the predicted plurality of events; and providing to the access terminal the stored information of the customer to the customer to allow the customer to conduct:
  (a) checking on status of an order or a transaction between the customer and the retail store;
  (b) selecting a payment option for a transaction between the customer and the retail store, the payment option being pre-set and being stored in the central database as a part of the information of the customer; and
  (c) receiving notification on status of an order or transaction, or an upcoming order or transaction between the customer and the retail store;

wherein the processor is further configured to execute computer instructions capable of:

based on the analysis of the information of the customer, providing the stored information of the customer to the customer to allow the customer to conduct:
  (a) reviewing a shopping or a transaction history of the customer;
  (b) notifying a store of an entry into or exit from the store by the customer;
  (c) visually providing an indication of purchased items by the customer upon exit from the retail store;
  (d) returning a previously-purchased item to the retail store, the returning being approved based on a transaction history of the customer stored in the central database;
  (e) receiving marketing information targeted toward the customer, the targeted marketing information being generated based on the information of the customer;
  (f) receiving preferences for services; and
  (g) receiving special offers.

18. A non-transitory computer-readable medium including computer instructions adapted to be executed by a processor for performing a method for providing a customer with enhanced shopping experience at a retail store, the method comprising:

storing information of the customer in a central database coupled to a server computer;

receiving, by an access terminal situated in the retail store, an RFID signal that is transmitted from a handheld device of the customer who is entering or in the retail store, the RFID signal carrying an identification that uniquely identifies the customer;

responsive to receiving the RFID signal from the access terminal, linking, by the server computer, the customer to information of the customer stored in a central database based on the unique identification of the customer;

analyzing, by the server computer, the customer's past shopping habit to predict a plurality of events that potentially interest the customer;

displaying in an event notification interface on the access terminal the predicted plurality of events to the customer;

displaying a transaction interface on the access terminal that allows the customer to transact at least one of the predicted plurality of events; and providing, on the access terminal by the server computer, the stored information of the customer to the customer to allow the customer to conduct:
  (a) checking on status of an order or a transaction between the customer and the retail store;
  (b) selecting a payment option for a transaction between the customer and the retail store, the payment option being pre-set and being stored in the central database as a part of the information of the customer; and
  (c) receiving notification on status of an order or transaction, or an upcoming order or transaction between the customer and the retail store; and based on the analysis of the information of the customer, providing the stored information of the customer to the customer to allow the customer to notifying a store of an entry into or exit from the store by the customer.

19. A non-transitory computer-readable medium including computer instructions adapted to be executed by a processor for performing a method for providing a customer with enhanced shopping experience at a retail store, the method comprising:

storing information of the customer in a central database coupled to a server computer;

receiving, by an access terminal situated in the retail store, an RFID signal that is transmitted from a handheld device of the customer who is entering or in the retail store, the RFID signal carrying an identification that uniquely identifies the customer;

responsive to receiving the RFID signal from the access terminal, linking, by the server computer, the customer to information of the customer stored in a central database based on the unique identification of the customer;

analyzing, by the server computer, the customer's past shopping habit to predict a plurality of events that potentially interest the customer;

displaying in an event notification interface on the access terminal the predicted plurality of events to the customer;

displaying a transaction interface on the access terminal that allows the customer to transact at least one of the predicted plurality of events;

providing, on the access terminal by the server computer, the stored information of the customer to the customer to allow the customer to conduct:
  (a) checking on status of an order or a transaction between the customer and the retail store;
  (b) selecting a payment option for a transaction between the customer and the retail store, the payment option being pre-set and being stored in the central database as a part of the information of the customer; and
  (c) receiving notification on status of an order or transaction, or an upcoming order or transaction between the customer and the retail store; and based on the analysis of the information of the customer, providing the stored information of the customer to the customer to allow the customer to conduct:

(a) reviewing a shopping or a transaction history of the customer;
(b) notifying a store of an entry into or exit from the store by the customer;
(c) visually providing an indication of purchased items by the customer upon exit from the retail store;
(d) returning a previously-purchased item to the retail store, the returning being approved based on a transaction history of the customer stored in the central database;
(e) receiving marketing information targeted toward the customer, the targeted marketing information being generated based on the information of the customer;
(f) receiving preferences for services; and
(g) receiving special offers.

* * * * *